United States Patent [19]
Löfberg

[11] Patent Number: 4,582,985
[45] Date of Patent: Apr. 15, 1986

[54] DATA CARRIER

[76] Inventor: Bo Löfberg, Vindragarvägen 12, S-117 40 Stockholm, Sweden

[21] Appl. No.: 444,579

[22] PCT Filed: Mar. 18, 1982

[86] PCT No.: PCT/SE82/00076
§ 371 Date: Nov. 12, 1982
§ 102(e) Date: Nov. 12, 1982

[87] PCT Pub. No.: WO82/03286
PCT Pub. Date: Sep. 30, 1982

[30] Foreign Application Priority Data

Mar. 18, 1981 [SE] Sweden .................................. 8101707

[51] Int. Cl.⁴ .............................................. G06K 5/00
[52] U.S. Cl. .................................... 235/380; 235/382; 235/492; 340/825.34; 382/4
[58] Field of Search ....................... 235/380, 381, 382; 340/825.34; 382/4, 5; 40/5, 625

[56] References Cited

U.S. PATENT DOCUMENTS

| | | |
|---|---|---|
| 3,201,961 | 8/1965 | Williams et al. . |
| 3,287,839 | 11/1966 | Rotwein et al. . |
| 3,383,657 | 5/1968 | Claasen et al. . |
| 3,399,473 | 9/1968 | Jaffe . |
| 3,419,287 | 12/1968 | Rudie . |
| 3,504,343 | 3/1970 | Ditlow . |
| 3,593,292 | 7/1971 | Scott . |
| 3,637,994 | 1/1972 | Ellingboe . |
| 3,713,235 | 1/1973 | Roberts . |
| 3,762,081 | 10/1973 | Armbruster et al. . |
| 3,781,855 | 12/1973 | Killen ..................................... 382/4 |
| 3,859,633 | 1/1975 | Ho et al. . |
| 3,972,138 | 8/1976 | Armbruster et al. . |
| 4,015,240 | 3/1977 | Swonger et al. . |
| 4,023,012 | 5/1977 | Ano et al. . |
| 4,083,035 | 4/1978 | Riganati et al. . |
| 4,100,689 | 7/1978 | Broune . |
| 4,202,120 | 5/1980 | Engel . |
| 4,213,038 | 7/1980 | Silverman et al. ............. 235/381 X |
| 4,256,955 | 3/1981 | Giraud et al. ........................ 235/381 |
| 4,353,056 | 10/1982 | Tsikos ...................................... 382/4 |
| 4,429,413 | 1/1984 | Edwards .................................. 382/4 |
| 4,455,083 | 6/1984 | Elmes ................................. 382/4 X |

Primary Examiner—David L. Trafton
Attorney, Agent, or Firm—Frishauf, Holtz, Goodman & Woodward

[57] ABSTRACT

A data carrier (preferably shaped as a credit card or the like) holds information about the owner, card issuing organization, account number, etc., and comprises an internal processor for processing supplied identification information of the owner during a card verification process, and for generating an acceptance signal as a result of a positive verification. The internal processor includes a verification device which comprises a sensor (2) for sensing a fingertip of the owner and obtaining corresponding finger print line information. The sensor has sensing elements, each having a sensing surface (9') for contacting the fingertip and a registration device (23,24) which is controllable by the sensing surface. The verification device also includes a reader (3) for reading the state of registration of the fingerprint on the sensing surface, a signal processor (4) for forming an identification bit sequence from the registration state information, a memory (6) for permanently storing a previously and correspondingly obtained reference bit sequence, a comparator (5) for comparing the identification bit sequence and the reference bit sequence and for generating an acceptance signal (coincidence) between the sequences is acceptable, and a controller for the control and current supply (8,10) of the verification device during the verification process.

17 Claims, 10 Drawing Figures

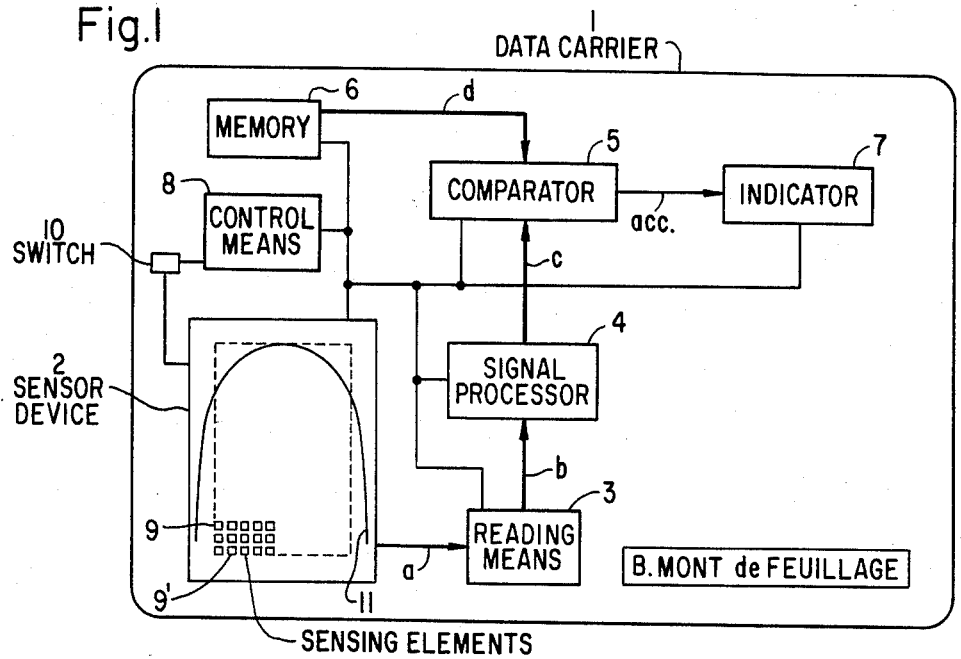

DATA CARRIER

BACKGROUND OF THE INVENTION

This invention is directed to a data carrier being preferably shaped as a personal card (i.e., credit card) holding information about the owner, the card issuing organization, account number, etc., and being intended for manual utilization at the place of use or by means of a read-in/read-out device included in a terminal equipment. The data carrier comprises means for internal processing of supplied identification information of the owner during a verification process and for generating an acceptance signal as a result of a verification of the identity and/or right of the owner to use the data carrier.

Data carriers or cards of the type indicated above are known and are generally referred to as credit cards. Normally, said cards are dimensioned according to an accepted ISO standard, which means that the card is made from a PVC material being bendable to some extent and having the approximate dimensions of 0.8 mm × 54 mm × 85 mm.

Data cards intended to be handled manually may comprise said information in an embossed print allowing the information to be transferred to a payment verification by means of a print operation.

Data cards intended to be handled by a terminal equipment may comprise a loop of magnetizable material comprising said information, and the terminal comprises a read-out device for reading the information which is registered magnetically and a read-in device for a read-in of new information. Data cards of this type may alternatively comprise optically readable and writeable areas and may also be of the punched card type holding a combination of holes being mechanically readable by the terminal equipment.

Recently active data cards have begun to appear on the market. Said cards are provided with memory circuits and logic circuits of semiconductor type which allows for storing of information and processing of the same internally on the card. For communication with a terminal equipment, cards of this type are provided with a number of externally available electrical connection means or corresponding coupling means.

A general problem when data cards are used is the fact that a lost or stolen data card may be used without authorization by a different person. This problem may be eliminated if the user is obliged to verify his right before the data card may be used.

In the case of data cards intended for manual handling, the verification may be carried out in that the user verifies his identity by presenting a different identification document. Normally, however, a certification is not required when such a data card is used, among other things due to the fact that this will create a delay and give rise to a long line of people at the places of use. Instead the active control or check is carried out by means of so-called black lists comprising the numbers of all blocked accounts, which may have been blocked due to the fact the account holder has not fulfilled his obligations towards the accounting organization or the fact that the account holder has reported the card as lost. The black lists, being up-dated regularly, mean a significant increase of work at the places of use. Moreover, it is possible that a blocked account will not be observed during a manual check. As a consequence, the card will be used despite the fact that it should not. Furthermore a card, which has been lost for example, may be misused from the time it is reported as lost until an updated black list is available.

In order to improve the working situation at the places of use, so-called electronic "black lists" have been developed lately. Then, a data computer including a memory is used to check the list. In said memory the information about blocked accounts which was previously printed on the black lists is stored. During a check the actual account number is introduced and thereafter compared with the total of scored account numbers. Summarizing, even if a device of this type allows for an improved check, it may be concluded that an adequate solution to the described problem is not available for the time being.

For data cards intended to be handled by a terminal device, one method for preventing unauthorized use of the card means that the card holder will have to verify his right by introducing a personal identification code, i.e., a PIN code, via a key set of the terminal equipment. In the terminal, the PIN code introduced in this manner and other information which has been read out from the card are evaluated and if the result of the evaluation is positive, the data card is accepted and the transaction may continue. Handling of the secret codes means a significant administrative problem to the accounting or card issuing organization. To the card holder it means a practical problem to memorize the secret code comprising normally four digits. The last-mentioned problem is aggravated also by the fact that many persons today hold a number of different data or account cards of this type and, consequently, are forced to memorize a corresponding number of different secret codes. This may lead to a situation that a person in this situation, as a support to his memory, writes down the different codes and keeps the note easily available together with his credit cards. Obviously this means a drastic decrease of the security which is aimed at by the personal code.

Within the reasonably near future it may be expected that cards of the last-mentioned type will be useful more generally as a payment means at so-called POS terminals in shops of many different types. This actualizes a further security risk of the system described above according to which a PIN-code is evaluated in a terminal device. People within this field talk about the so-called "wardrobe case". Thereby is understood the situation when a card holder may come into contact with a false terminal at a place of purchase. Then the customer will introduce this PIN-code without any doubts. The PIN-code and the associated account number will be registered by means of an equipment arranged at a different place, that is in the so-called "wardrobe". In this "wardrobe" is also kept equipment for forwarding the transaction correctly. The registered pairs of associated account numbers and PIN-codes may afterwards be used for preparation of false account cards. If these false account cards are used now and then and within an extended geographical area, a significant time may elapse until the forgery is detected. The main reason behind this problem is the fact that the account number information and the PIN-code information are transferred to an evaluation device on signal lines being already or which may be made physically available, allowing thereby detection of the information.

U.S. Pat. No. 4,023,012 proposes a solution which eliminates the problem of administrating the secret code numbers. According to this solution the card holder may by himself select his secret code whtn the card is used for the first time. This code is stored on the card and is later on used for verification when the card is used thereafter. In case a person is a holder of a number of different cards of this type, it may happen that this person selects the one and same secret PIN-code for all of these cards in order to make it easier to memorize the PIN-code. Alternatively, this person may select his PIN-code in accordance with a rule which is simple. e.g., as part of his telephone number or citizen identification number (i.e., social security number). In both of said cases the security is influenced negatively since detection of the secret code is facilitated and this opens for a misuse of a number of different account cards.

From U.S. Pat. No. 3,399,473 is known a data card comprising a number of rotatable and translatable switching means. Said switch means are provided with numeric or alphabetical designations. By the setting of a secret number or a letter combination, which is known to the holder, the switching means are made to close an internal electrical circuit on the data card. When the data card is thereafter used in a terminal device, the so-closed electrical circuit may be used as a verification of the holder's authority. Similar technical solutions are disclosed in U.S. Pat. Nos. 3,504,343; 3,287,839; 3,593,292; 3,713,235; 3,762,081; 3,972,138 and 4,100,689. All of the data cards described in these U.S. patents have in common the drawback that the holder must memorize a part of or a complete secret code. Furthermore, the construction of the cards including mechanically adjustable means will have to be considered as an old state of the technical development.

The object of the invention is to provide a data carrier or data card in which the drawbacks described above have been eliminated and which makes possible a verification of the user by the use of means accommodated on the card without the use of a secret information which must be memorized.

SUMMARY OF THE INVENTION

The object of the invention is obtained by a data carrier as defined in the introduction and which, according to the invention, is characterized in that a verification device is provided for carrying out said verification process and comprising a sensor device for sensing a finger tip of the owner and obtaining the corresponding finger print line information, said sensor device comprising sensing elements each having a sensing surface for contacting the finger tip and a registration means, which is controlled by said sensing surface and the registration state of which during the sensing operation is defined dependent on the relative positions of the sensing surface and to a finger print line, means for reading said state of registration, signal processing means for forming an identification bit sequence from the registration state information of said registration means obtained by said reading, memory means for permanent storage of a previously and correspondingly obtained reference bit sequence, comparator means for comparing said identification bit sequence and said reference bit sequence and for generating said acceptance signal when the degree of coincidence between said bit sequences is acceptable, and means for the control and current supply of said verification device during the verification process.

The problem of memorizing a secret code is eliminated since the identification information is received from a finger tip pattern. The finger tip pattern is unique for each individual and thereby provides for a good identification security. Due to the fact that the verification is carried out on the very data carrier, the risk of the above related wardrobe case is eliminated and the verification may be carried out with the least possible inconvenience for the user by the use of the personal data carrier only. The achieved verification security allows for a use of the data carrier as a mere identification document, for example, at border passages between countries and at entrances to restricted areas.

BRIEF DESCRIPTION OF THE DRAWINGS

FIG. 1 shows a block diagram of the verification device which is provided on the data carrier;

FIG. 2 shows one embodiment of a sensing element included in the verification device;

FIG. 3 shows a modified embodiment of the sensing surface in FIG. 2;

FIG. 3a shows a further modified embodiment of the sensing surface;

DETAILED DESCRIPTION

Figure 4:
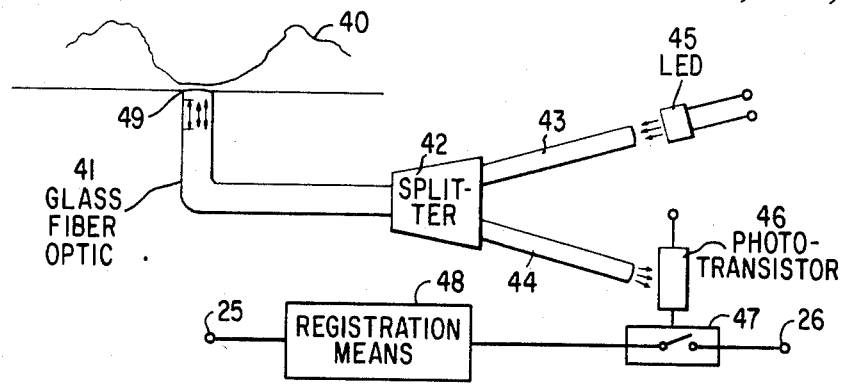
FIG. 4 shows schematically one embodiment of an optical sensing element.

The block diagram shown in FIG. 1 of the verification device on the data carrier 1 comprises a sensor device 2 having sensing elements arranged in the shape of a sensing matrix 9. The dimension of the sensing matrix is adapted to the finger tip pattern of a thumb. The sensing elements may be read by means of a reading means 3 connected to the sensing device via a transmission line a. By the reading means 3, the sensing elements may be read in accordance with a predetermined reading program, and the information will obtain a binary form.

Via a transmission line b the binary information is forwarded to a signal processing device 4 in which the information is transformed so that it may be used for identification. Dependent on the predetermined reading program, the information may be modified with respect to the position and orientation of the finger on the matrix during the recording operation. Finally, an identification bit sequence is calculated from said information, the method of calculation and the bit number of said bit sequence being such that it will characterize the finger tip pattern in a way which is adequate with respect to the security of identification.

The identification bit sequence is forwarded to a comparator means 5 via a transmission line c. At the same time a reference bit sequence is supplied to the comparator 5 from a memory 6, which may comprise a PROM-memory into which the reference bit sequence has been programmed when the data carrier was delivered to the holder. Preferably, the number of bits of the reference sequence and of the identification bit sequence are equal and the same is calculated in a manner which corresponds to the calculation of the identification bit sequence in an equipment which, besides the means which correspond to units 2, 3 and 4, also comprises means for programming the memory 6. Methods and means for programming a PROM- or a ROM-memory are generally known in this field.

Block 8 comprises means for control and current supply of the other units. In order to simplify the disclosure the interconnections are shown as one single line, which transmits control signals as well as supply current. The control signals are generated by a microprocessor, being programmed to control the reading operation of the reading means 3 and the calculation performed by the signal processing device 4. As will be evident from the following, the microprocessor may receive control information which is specific to the individual from memory 6. The current supply is activated by a switch 10, being constantly in a so-called "stand by" position. Switch 10 obtains its control information from a touch contact. This contact may be provided separately on the data carrier or the sensing elements of the sensing matrix 9. When the finger tip is pressed against this contact, the switch 10 is changed to a closed position and closes thereby the current supply loop. Thereafter the switch will stay closed during a given amount of time necessary for performing the identification process and the eventually following transactions or alternatively, it may comprise a bistable circuit, for example a flip-flop, from which follows that the switch will change from a closed position to an open position when the sensing element is activated a second time. In FIG. 1 it is assumed that said touch contact comprises one element of the matrix 9, which is indicated by a connection between the switch 10 and the sensing device 2.

In case the comparator 5 detects a sufficient degree of coincidence between the reference bit sequence from memory 6 and the calculated identification bit sequence from the signal processing device 4, an acceptance signal acc is generated and supplied to the indicator 7. The indicator 7 comprises a switching means which may be activated by the signal acc for activating a likewise included light emitting diode (LED) which transmits a green radiation when the acc-signal is received. This green light then indicates the fact that the holder of the data carrier has been able to verify his right to use the same. Alternatively, the block 7 may comprise a switching means which, when receiving the acc-signal, closes a signal path and thereby enables an exchange of data between the data carrier and a terminal equipment.

The data carrier is provided with some given amount of written information, which in FIG. 1 is illustrated by the name of the card holder, and a mark 11 illustrated as a schematic finger tip for a course adjustment of the finger on the matrix 9.

It is observed that, besides the sensing device 2, the separate blocks are shown in an enlarged scale in FIG. 1. The physical structure of blocks 3–10 corresponds to prior art of said so-called active cards. Blocks 3, 4, 6 and 8 represent functions which are well-known and the circuitry thereof corresponds to prior art of integrated semiconductor circuits. Said blocks may be made in the shape of one LSI-circuit which may be accommodated on one single silicon wafer or chip. For what remains about the detailed configuration of the separate blocks and the interconnections on the data carrier according to the invention, reference is made to U.S. Pat. Nos. 4,001,550 and 3,637,994, disclosing active cards. The French magazine Inter Electronique, May 29, 1978, discloses an active card which is named "electronic check".

The sensing device is built from sensing elements arranged in the shape of a matrix 9 as is illustrated by the sensing surfaces 9' comprised in the sensing elements 9' in FIG. 1. In FIG. 2 is shown one embodiment of the detailed configuration of the one single sensing element. The sensing surface in this case comprises two metal plates of which one circumferential plate 22 is connected to a current supply line 25 and one internal plate 21 which, via a registration means 23, is connected to the current supply line 26. Lines 25 and 26, respectively, may be connected to the positive and negative poles, respectively, of said accummulator via the switch 10. The internal metal plate 21 is separated from the circumferential plate 22 by a slot. Because of the disclosed shape of said plates, the internal plate will determine the resolution at the place or area which is sensed. It is possible to have the dimensions so that the plate 21 may have a diameter of 0.05 mm, the slot may have a width of 0.025 mm and the circumferential plate may have an external diameter of 0.2 mm. This dimensioning of the plate 21 means that the same may separate details of the finger print line pattern having a mutual distance which is greater than 0.05 mm and that approximately 16 sensing points per $mm^2$ are obtained. By the fact that plate 22 fully encloses the plate 21, crosstalk between adjacent sensing elements is eliminated due to the fact that a finger print line in contact with the plate 21 of a first sensing element may not have contact with the plate 22 of a second, adjacent sensing element without being also in contact with the plate 22 of said first sensing element. Contact plates 21 and 22 of each of the sensing elements may be obtained by photo-etching starting from a continuous metal layer.

Said registration means 23 comprises a CCD-element which is charged when the current path from line 25 to line 26 is closed via a detail of the finger print line pattern closing the current path between contact plates 21 and 22. If plate 21 and plate 22 are not interconnected by a finger print line, said current path will not be closed and as a consequence the CCD-element will not be charged. Alternatively, the registration means 23 may comprise a bistable element which is switched to a second stable condition when a current of a given magnitude flows through said current path.

FIG. 3 shows an alternative embodiment of the sensing elements comprised in said sensing matrix. In this case a common contact plate 30 is used for the total number of sensing elements. Consequently, plate 30 corresponds to an integration of the circumferential contact plates 22 according to FIG. 2 into one continuous element. Plate 30 comprises a metal layer in which apertures 30 corresponding to each of the sensing surfaces 9' (FIG. 1) have been obtained by photo-etching or a different corresponding method. The common plate 30 is electrically connected to the current supply line 25. Centrally of each aperture 30 is provided an internal, point-shaped plate 32 corresponding to the internal plate 21 in FIG. 2. In the same manner, as disclosed in FIG. 2, the internal plates 32 are respectively connected to the current supply line 26 via a respective registration means. Said pointshaped plates 32 may adequately be formed together with the apparatus 31 during the one and same photo-etching operation. It is observed that the diameter of the apertures 31 has been exaggerated for the sake of clarity.

FIG. 3a shows a cross-section of a sensing element comprised in the device according to FIG. 3. The common contact plate 30 comprises a metal layer. Plate 30 is arranged on an electrically insulating layer 33. In the center of the aperture of hole 31, the internal contact plate 32 is situated. Plate 32 is connected to an associated registration means 32 having a terminal 35 for connection to the current supply line 26 (see FIG. 3). As shown in FIG. 3a, the internal plate 32 is somewhat lowered with respect to plate 30. By lowering plate 32, it is safeguarded that electrical contact between plates 30 and 32 is obtained via the finger print lines only and not via internals between these lines.

Reception of information from the finger tip pattern may be obtained by the use of the heat transmission from the finger to a sensing device comprising a thermosensitive element. Then the finger print lines can be distinguished because transmission of heat from a finger print line to a sensing element is greater than the heat transmission from the interval between two finger print lines to a sensing element. With reference to FIG. 3a, the internal contact plate 32 may then be replaced by a thermistor element with temperature-dependent resistance. When a galvanic contact is created between plate 30 and thermistor 32, a current is obtained through the current loop closed thereby between lines 25 and 26 (see FIG. 2), which is dependent on the temperature of the thermistor. Accordingly, the rate of current is decided by the position of the thermistor relative to a finger print line. If the registration means 34 comprises a chargeable CCD-element, its amount of charge after the interval of information reception indicates the position of the finger print line relative to the thermistor 32. By expressing the value of charge by a bit sequence comprising eight bits, for example, a "grey color scale" is obtained and thereby an increased amount of information can be used for determining the extension of the finger print line.

An alternative use of said differences of heat transfer is to construct each sensing element as a thermo-electrical transducer. Such a transducer comprises two elements of different metals which are comprised in an electrical circuit. When the metal elements are given different temperatures, an electromotive force is produced between the elements and an electric current is obtained in the circuit. This current may control said registration means (23, 34). One of the metal elements is arranged adjacent to the surface of the sensing device and the other metal element in contact with and under the first-mentioned one. The increase of temperature of the surface adjoining metal elements, which occurs when the finger tip is pressed against the sensing device, produces a difference in temperature between the metal elements and thus creates said current.

The sensing elements may also be of an optical type utilizing the fact that reflected light from an illuminated finger tip comprises information about the finger print line pattern. This is based on the fact that reflected light from a given sensing point varies with the position of the point within the pattern. Thus, the amount of reflected light from a sensing point which falls in the middle of a finger print line is greater than the amount of reflected light from a sensing point which falls on the edge of a finger print line. FIG. 4 shows schematically an embodiment of such an optical sensing element. It is to be observed that FIG. 4 illustrates the sensing element in a considerably enlarged scale and serves to illustrate its principal construction. FIG. 4 shows a glass fiber 41, the opening 49 of which terminates at the sensing surface of the sensing device. A finger tip is pressed against the sensing surface, which is schematically shown by line 40. Via a radiation splitting element 42, the fiber 41 is in optical contact with two further fibers 43 and 44. A light-emitting diode 45 is arranged at the input surface of fiber 43 to supply light, as shown, into fiber 43 during the sensing interval. The output surface of fiber 44 is connected to a phototransistor 46, which forms part of a control circuit for the control of a switch 47. Switch 47 is series-connected to the registration means 48, which corresponds to registration means 21 and 34 in FIGS. 2 and 3a, respectively, between current supply lines 25 and 26. During the sensing interval, light is supplied from the lightemitting diode 45 into the fiber 43 and via the element 42 to fiber 41. This light is reflected against the finger tip pattern at the output surface 49, which is shown at the output surface by arrows of opposite direction. The reflected light passes through fiber 41 and element 42 to fiber 44 and is directed, via the output surface thereof, towards the phototransistor 46. The phototransistor 46 then becomes conductive, thereby activating the control circuit of switch 47 and the switch is closed. Current may then flow from line 25 to line 26 via the registration means 48. The phototransistor 46 is so biased that the transistor will not be conductive until the amount of reflected light exceeds a threshold value. The threshold value is so selected that the phototransistor 46 will be activated only when the fiber opening 49 meets a finger print line. The registration state of the registration means 48 will then indicate the relative positions of the fiber opening 49 and a finger print line, and thereby information about the extension of the finger print line along the sensing surface may be obtained.

In a modified embodiment of the device in FIG. 4, the light-emitting diode 45 and its associated phototransistor 46 are arranged more or less in direct contact with the sensing surface. The optical feedback of the reflected light may be improved by the provision of an intermediary optical element.

In case the registration means 48 comprises an analog registration element, for example a CCD-element, then the phototransistor 46 may alternatively be part of a charging circuit for said CCD-element. Because the conductivity of the phototransistor 46 is controlled by the amount of the reflected light, the charge of the CCD-element will depend proportionally on the relative positions of a finger print line and the fiber opening 49. Therefore, the "gray-scale information" mentioned above may be obtained by this type of sensing element.

Optical sensing of fingertip patterns have been described in U.S. Pat. Nos. 3,201,961; 4,083,035; 3,859,633 and 4,015,240.

At the time when a data carrier according to the invention is issued, the fingertip pattern of one thumb or of a different finger of the owner is recorded. From the recorded information a reference bit sequence, which is unique for the owner or holder, is calculated and this sequence is stored in memory 6 (FIG. 1). When the holder later on is to identify himself against his data carrier, the fingertip information should again be recorded in order to allow for a comparison against the reference bit sequence. This means substantially two problems. First, it must be safeguarded that the direction of the fingertip relative to the sensing surface will be the same as during the recording of the reference bit sequence or otherwise it must be possible to modify the recorded information with respect to a different orientation of the fingertip. Second, the information which is recorded in the sensing device must be read and processed in a way which is reproducible. With regard to the orientation of the fingertip, it may be concluded that a physical orientation of the fingertip on the sensing surface with the necessary accuracy is difficult to obtain. In the following is described how to obtain a reference point in the fingertip pattern and, with guidance therefrom, how to obtain information of the fingertip pattern in a reproducible manner.

Figure 5A:
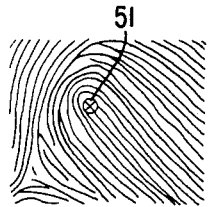
FIG. 5a, 5b and 5c, respectively, show the principal zone of three different finger tip patterns.

FIG. 5 shows the so-called principal zone of a number of different fingertip patterns. The pattern a is a so-called single loop pattern, the pattern b is a so-called elliptic pattern and the pattern c is a so-called combined pattern. The finger print line patterns are built around a central point named inner terminus. In the pattern a the inner terminus is situated at 51. In the patterns b and c the inner terminus may not be defined so obviously, which at the same time illustrates the problem of defining a true reference point in the principal zone. In the pattern a point 51 is an obvious choice and in the patterns b and c points 52 and 53, respectively, are adequate choices. In the following is described how said points are defined by scanning the pattern line by line using a scanning line which is directed transverse to the substantially straight parts of the finger print lines close to the reference point.

Figure 6:
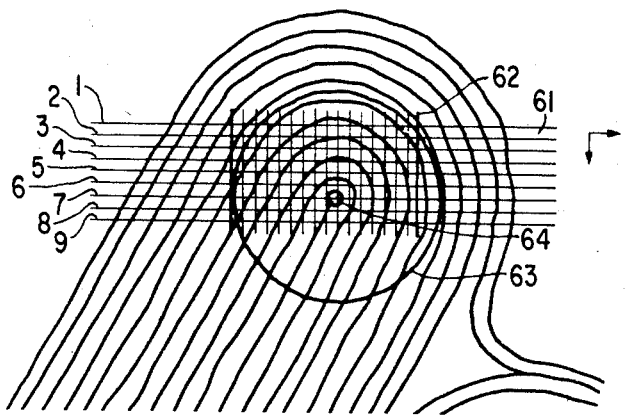
FIG. 6 shows a simplified finger tip pattern illustrating a method for the reception of information.
Figure 7:
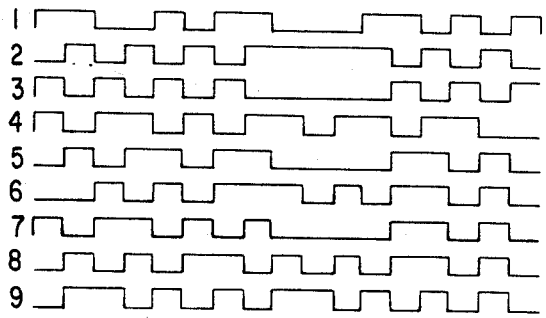
FIG. 7 illustrates signal waveforms obtained at the reception of information according to FIG. 6.

In FIG. 6 is shown a schematic fingertip pattern of the single loop type. A scanning line 61 is moved stepwise in the direction of the arrow across the fingertip pattern. In the sensing device this means that the sensing elements thereof are read out in a manner such that information is obtained from the elements coinciding with said scanning line. Reading of the elements of a matrix in this manner is generally known. For a density of sensing elements, which is assumed for the purpose of illustration only, which corresponds to about two elements per line of the finger print line pattern in FIG. 6 and assuming that the registration means of each sensing element positioned on or in connection with a finger print line holds a "1" level and that the remaining elements hold a "0" level, the output signals shown in FIG. 7 are obtained within the sensing window 62 along the scanning lines 61 during scanning from left to right. The output signals are represented as bit streams of 0 and 1 and may then be processed in the signal processing means 4 under control of the microprocessor of block 8. The bow-form of the finger print lines will give rise to a characteristic longer sequence of 0 in case the scanning line falls between two finger print lines, as scanning lines 1 or 3 for example, which is illustrated by the corresponding signals 1 and 3, respectively, in FIG. 7. In a corresponding manner a characteristic longer sequence of 1 is obtained in case the scanning line is tangent to a finger print line bow, as is the case of scanning line 2 in FIG. 6, for example, which is illustrated by the corresponding signal 2 in FIG. 7.

The microprocessor program performs the following steps of operation:
go to the line 0-interval in any one of the signals 1–9;
define correspondingly positioned long 0-intervals of the remaining signals;
calculate, for the defined 0-intervals, an average bit position which is equal to the integer of the average value;
choose as a reference bit the bit of the average position in the signal having the highest order number comprising a long 0-interval;
define the sensing surface of the sensing element comprising the reference bit as a reference point of the recorded fingertip pattern.

If the bit positions of the signals in FIG. 7 are numbered 1–17 from left to right, for the 0-intervals in signals 1, 3, 5 and 7, there is obtained a "bit position number sum" which equals 163. The number of bits within the intervals equals 16. The average bit position will then be 163/16=10 and 3/16, the integer part of which is 10. Accordingly, the encircled point 64 in FIG. 6 is defined as a reference point.

The signals in FIG. 7 are obtained in the sequence shown by scanning the finger print line pattern in FIG. 6 by moving stepwise a horizontal scanning line from top to bottom with a line scanning direction from left to right. In the matrix of FIG. 1, this means line by line reading from left to right of the registration means comprised in the sensing elements.

Figure 5B:
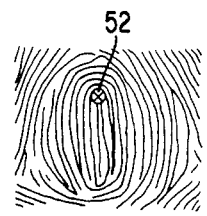
Figure 5C:

In the patterns according to FIGS. 5b and 5c, the scanning should likewise be from top to bottom in order for the respective reference points 52 and 53 to be surely defined according to the described method. For different patterns it may be adequate to carry out a horizontal scanning from bottom to top or a vertical scanning from left to right or ice versa. Therefore, the manner of scanning should be adapted to the type of fingertip pattern in question.

The choice of scanning method may be done in connection with the recording of the reference bit pattern when the data carrier is issued. Then, as a first step, an adequate reference point in the fingertip pattern is selected and thereafter a scanning method which is adequate for establishing the same is selected. At the same time the control information required for the scanning method is selected or formed, which information may be fully individual, but which preferably comprises a control program which has been prepared beforehand for the type of fingertip pattern in question.

The rules for decision as described above for establishing the reference point may be formed otherwise and may eventually be specifically adapted to each individual.

Individualized information, as mentioned above with respect to scanning of the sensing elements and the decision rules for the establishment of the reference point, are programmed into the memory 6 when the data carrier is issued.

After establishing the reference point the fingertip information is read out by polar reading of the registration state of the registration means. This means reading of sensing elements coinciding with one or a number of reading circles having its center in the reference point. The difference of the radii between the reading circles is then equal to the center distance between two adjacent sensing elements of the sensing matrix. Alternatively, the one and same reading circle may be used but then the center thereof is each time displaced to another sensing element adjacent to the sensing element established as a reference point, and thereby a decision of the position of the reference point which is eventually wrong is taken into consideration.

In FIG. 6 is shown a scanning or reading circle 63. The reading of the sensing elements, coinciding with the circle, starts at the intersection to the right between the scanning line 7 and the circle and is carried out clockwise. The scanning will result in a signal of the same type as the signals in FIG. 7, which signals may be represented by a sequence of 1 and 0. By performing the scanning along the circle 63, having its center at the reference point which may be established in a reproducible manner, principally the one and same bit sequence is always obtained with the difference that the position in the bit sequence of the bit which is first read out may vary, due to a different relative polar orientation of the finger print line pattern and the sensing matrix, that is a different orientation of the thumb on the sensing device 2 during subsequent recording occasions.

The obtained bit sequence may be used directly as an identification bit sequence, but if necessary the number of bits may be reduced according to a predetermined algorithm in the signal processing means 4.

From what has been mentioned above, it should be clear that a number of reading circles may be used and then a corresponding number of different bit sequences are obtained. The choice between the alternatives of using different radii or different center points of the reading circles will be made based on a repeated trial of different reading methods when the reference bit sequence is formed. The reading method giving the best verification result is selected and the corresponding individualized control information is programmed into memory 6.

In the case of reading of several bit sequences, these may either be used separately for forming a corresponding number of identification bit sequences which are thereafter separately compared with the reference bit sequence, or, alternatively, the bit sequences may be superposed according to a predetermined algorithm and the result thereof may be used as an identification bit sequence. Also in this case, a choice which is specific to the individual may be done when the reference bit sequence is formed. If so, the corresponding control information is programmed into the memory 6.

In the case of reading of several bit sequences, these may either be used separately for forming a corresponding number of identification bit sequences which are thereafter separately compared with the reference bit sequence, or, alternatively, the bit sequences may be superposed according to a predetermined algorithm and the result thereof may be used as an identification bit sequence. Also, in this case a choice which is specific to the individual may be done when the reference bit sequence is formed. If so, the corresponding control information is programmed into the memory 6.

According to what has been mentioned above, the sensing elements of the device 2 may comprise analog registration means 23 (see FIG. 2), the analog values of which may be expressed by bit streams comprising 8 bits, for example. It is obvious that the processing of information within the signal processing means 4 will be more extensive when such registration means are used.

Reverting to the case, which is illustrated in FIG. 6, of one reading circle 63, the identification bit sequence obtained as described above comprises, from a principal point of view, bit information which is the same as the reference bit sequence but displaced one or several bit positions. The identification and reference bit sequences are compared in the comparator 5. At lack of coincidence or a degree of coincidence which is too low, for example below 90% of the number of bits, the identification sequence is displaced one bit position in a circulating register and thereafter a next comparison is made. This is made repeatedly until a required coincidence is obtained and at that point the acceptance signal acc is generated. The signal acc activates the indicator 7 which verifies the right of the possessor to use the data carrier.

From the above it is clear that the meory 6 may be programmed with control information which is specific for the individual and which is related to the following:
horizontal or vertical scanning lines;
scanning direction along the scanning lines;
direction of displacement of the scanning lines;
decision rule of obtaining the reference point;
one or several reading circles;
varying radius or center point when using several reading circles;
calculation of the identification bit sequence.

By choices of this type, which are specific to the individual, the processing of information on the data carrier is simplified with a possibility to keep the security of verification unchanged. An increased number of choices which are specific to the individual will further simplify the signal processing on the data carrier. This in turn requires a correspondingly increased data processing capacity when the reference bit sequence is formed. However, this is not a problem.

With the aim to clarify the description above, it has been directed to a data carrier having on the carrier an indicating means which directly indicates the outcome of the verification process. A data carrier of this type will allow for a complete protection against unauthorized use of properly issued, authentic data carriers because the same may be activated by the legitimate owner only. Consequently, this prevents an unauthorized use of lost or stolen cards. However, it is emphasized that a so-shaped card will give no protection against false data carriers provided with a corresponding indicating means because of the fact that said indicating means may be activated by an arbitrary type of switch without the need for carrying out a verification process as described above.

The last-mentioned poses a problem when the data carrier is intended for a manual use. An improved protection in this case may be obtained by combining the verification device according to the invention with a structure of the data carrier or card itself which is difficult to duplicate, which may be obtained by providing the card with a photograph of the owner or a graphic pattern of the type which is used on banknotes.

For data carriers intended to be handled by a terminal equipment, the authenticity of the data carrier and preferably also the authenticity of the terminal is verified by using instead said acceptance signal for the activation of a signal path for the exchange of identification information between the data carrier and the terminal. The "electronic block list" mentioned above may have the form of a simple terminal equipment comprising a read-in/read-out device. After the generation of said acceptance signal and switching of said switching means, the data carrier is introduced into the read-in/read-out device. Information, which is stored on the data carrier, about the account number of the owner, being preferably protected as a matterof information or physically by the structure of the storage means, is supplied to the terminal and, after being eventually signal processed, compared to blocked account numbers. At lack of coincidence an indication lamp is activated which will then indicate that the owner is an authorized person, that the data carrier is authentic, and that the corresponding account is not blocked.

Above a number of U.S. patents have been referred to from which it is known before to use a finger print as a means for identification. Equipment for the recording and processing of finger print information are described in said U.S. patents. Said equipments are intended to be positioned at the places of use, for example in a bank locality. It may be concluded that equipment of this type, if used at all, has not come into practice to an extent which should be motivated by the security of identification which is obtainable. One important reason behind this is the fact that it is not desirable from the point of view of the users, that is banks, etc., to introduce a method of identification of such a "criminal nature", that is the fact that finger prints have been used since long ago for identification of criminals and that very extensive data registers about finger prints are available. An owner of a data carrier which is beyond any reproach is expected to feel a psychological barrier or unwillingness against such an identification method. The judgment has been that this, in combination with the hygenical and practical objections which may follow from the fact that several persons use the one and same equipment, may possibly have a negative influence on the relations with customers.

It may be appreciated that the data carrier according to the invention eliminates the objections mentioned above because the identification is carried out internally on a personal data carrier and not in a central equipment, which may be suspected to be connected to a finger print register of criminals, and because the recording of the fingertip information is carried out in connection with the "thumb grip" which is normally used when the data carrier is handled by its owner. In this connection, it is observed that the position of the matrix 9 in FIG. 1 should be regarded as an example and obviously this position may be fitted to said "thumb grip".

I claim:

1. A data carrier of the personal card type, holding information about at least one of the owner, the card issuing organization, account number, etc., and being intended for manual utilization at a place of use or by means of a read in/read out device comprised in a terminal equipment, said data carrier comprising:
   means for carrying out a verification process which includes internal processing of supplied identification information of the owner during said verification process and for generating an acceptance signal (acc) as a result of a verification of the identity and/or right of the owner to use the data carrier;
   said means including:
   a verification device for carrying out said verfication process and comprising a sensor device (2) for sensing a finger tip of the user of the card and obtaining corresponding finger print line information of said user, said sensor device (2) comprising a plurality of sensing elements each having a sensing surface (9') for contacting the finger tip of the user and a registration means (23; 34) which is controllable by said surface and the registration state of which during the sensing operation is defined dependent on the relative positions of the sensing surface and a finger print line;
   reading means (3) for reading said state of registration;
   signal processing means (4) coupled to said reading means for forming an identification bit sequence from the registration state information obtained by said reading;
   memory means (6) for permanent storage of a previously and correspondingly obtained reference bit sequence;
   comparator means (5) for comparing said identification bit sequence formed by said signal processing means and said reference bit sequence and for generating said acceptance signal (acc) when the degree of coincidence between said bit sequences is within a predetermined acceptance range; and
   control means for the control and current supply (8,10) of said verification device during the verification process.

2. The data carrier of claim 1, wherein said verification device includes an adjustable switching means (7) arranged for activating, at the reception of said acceptance signal (acc), a visually readable indicating means (7).

3. The data carrier of claim 1, wherein said verification device includes an adjustable switching means (7) arranged for activating, at the reception of said acceptance signal (acc), a signal path for the transmission of information between the data carrier and a terminal equipment.

4. The data carrier of any one of claims 1, 2 or 3, wherein each sensing surface comprises an internal contact plate (21) and a surrounding contact plate (22) surrounding said internal plate but separated from said internal plate by a non-conductive slot, said slot being adapted to be overbridged electrically by a detail of a finger tip pattern of the user; a first current supply line (25) connected to said surrounding plate; and a second current supply line (26) connected to said internal plate via a respective registration means (23); whereby current is supplied to said registration means when said slot is overbridged by a finger tip pattern of the user.

5. The data carrier of claim 4, wherein said surrounding contact plates of said sensing surfaces are integrated into a common contact plate (30), comprising for each of said sensing elements a ring-shaped hole (30) corresponding to said slot and in the center of which is provided said internal contact plate (32), said internal contact plate being substantially point-shaped.

6. The data carrier of claim 1, wherein each sensing surface comprises an element the resistance of which is temperature dependent, the magnitude of the current which is supplied to said registration means being thereby controlled by the transmission of heat from the finger tip to the sensing surface.

7. The data carrier of claim 1, wherein each sensing surface comprises an element of a thermoelectric transducer comprising two elements of different types of metal, and which is temperature sensitive, for controlling the magnitude of the current which is supplied to said registration means as a function of the transmission of heat from the finger tip to the sensing surface.

8. The data carrier of any one of claims 1, 2 or 3, wherein each sensing surface comprises an optical sensing element (41, 49) for the supply of light to a contacting detail of the finger tip of the user and for the reception of reflected light from the same detail, said optical sensing element comprising a light source (45) and a means (46) which is sensitive to said reflected light and which is arranged to control the registration means (48) responsive to reflected light.

9. The data carrier of claim 1, wherein said registration means (23,24) comprises a plurality of registration elements for analog registration, said analog registration elements generating an analog registration value dependent on the supply of current.

10. The data carrier of claim 1, wherein said registration means comprises a plurality of bistable elements which change their respective states when a current which is supplied exceeds a predetermined threshold value.

11. The data carrier of claim 1, wherein said current supply means (8,10) comprises activating means for temporarily activating the verification device, said activating means comprising a bistable element which is controllable via a touch contact element and which is so arranged to inactivate the verification device at a repeated operation of the touch contact element.

12. The data carrier of claim 1, wherein said memory means (6) comprises memory areas for permanent storing control information corresponding to a method for reading the registration means and decision rules for forming said identification bit sequence.

13. The data carrier of claim 12, wherein said memory areas store control information corresponding to the decision of a reference point (51, FIG. 5a) in the finger tip pattern and the reading of recorded finger tip pattern information from the registration means coinciding with a reading circle (63) having its center in said reference point.

14. The data carrier of claim 12, wherein said memory means (6) comprises memory areas for permanently storing control information which is specific to an individual, said control information being established during forming of said reference bit sequence.

15. The data carrier of claim 13, wherein said memory means (6) comprises memory areas for permanently storing control information which is specific to an individual, said control information being established during forming of said reference bit sequence.

16. The data carrier of claim 13, wherein said memory means (6) comprises memory areas for permanently storing control information which is specific to an individual, said control information being established during forming of said reference bit sequence.

17. The data carrier of claim 16, wherein said memory areas for storage of control information which is specific to an individual store information corresponding to at least one of the following: line-by-line scanning of the registration means by the use of horizontal or vertical scanning lines; reading direction along said lines; direction of displacement of said reading lines; decision rules for the evaluation of the information which has been read for establishing said reference point; number of reading circles for reading the finger tip pattern information; radius or center of a circle when several reading circles are used; and rules for establishing said identification bit sequence from the finger tip pattern information which is read along said circles.

* * * * *